United States Patent [19]

Müller

[11] Patent Number: 4,742,524
[45] Date of Patent: May 3, 1988

[54] LASER WITH VARIABLE EMISSION WAVELENGTH

[75] Inventor: Gerhard Müller, Aalen-Wasseralfingen, Fed. Rep. of Germany

[73] Assignee: Carl-Zeiss-Stiftung, Heidenheim/Brenz, Oberkochen, Fed. Rep. of Germany

[21] Appl. No.: 810,588

[22] Filed: Dec. 19, 1985

[30] Foreign Application Priority Data

Dec. 24, 1984 [DE] Fed. Rep. of Germany ....... 3447311

[51] Int. Cl.$^4$ .............................................. H01S 3/10
[52] U.S. Cl. ...................................... 372/20; 350/312
[58] Field of Search .................................... 372/39–42, 372/53, 54, 23, 20, 33, 34, 68, 89, 71, 72; 350/311, 312

[56] References Cited

U.S. PATENT DOCUMENTS

| | | | |
|---|---|---|---|
| 3,586,417 | 6/1971 | Fields | 350/312 X |
| 3,888,646 | 6/1975 | Kuriyama et al. | 350/312 X |
| 4,501,470 | 2/1985 | Yeh | 350/311 X |

OTHER PUBLICATIONS

Gans et al., "Optically Homogeneous Mixed Laser", C.R. Acad. Sci. Ser. B. (France), vol. 270, No. 21, pp. 1343–1346, May 1970.
Cloupeau et al., "Visualization . . . Effect", Applied Optics, vol. 12, No. 2, pp. 198–204, Feb. 2, 1973.

*Primary Examiner*—Eugene R. LaRoche
*Assistant Examiner*—Seung Ham
*Attorney, Agent, or Firm*—Hopgood, Calimafde, Kalil, Blaustein & Judlowe

[57] ABSTRACT

A laser with variable wavelength contains, as laser-active material in the laser resonator, a mixture consisting of a first substance present as granulate and of a fluid (liquid or gaseous) second substance. One of these substances is laser-active. The course of the dispersion curves (11-12, and 13-14, respectively) of the indices of refraction of the two substances is dependent on temperature and/or pressure or density, and the curves have at least one point of intersection. When the laser is excited, it emits at a wavelength ($\lambda_1$, $\lambda_2$) which corresponds to the point of intersection of the dispersion curves. The temperature and/or pressure or density of the mixture of substances within the laser resonator is varied for controlled selection of the emission wavelength ($\lambda_1$, $\lambda_2$).

15 Claims, 3 Drawing Sheets

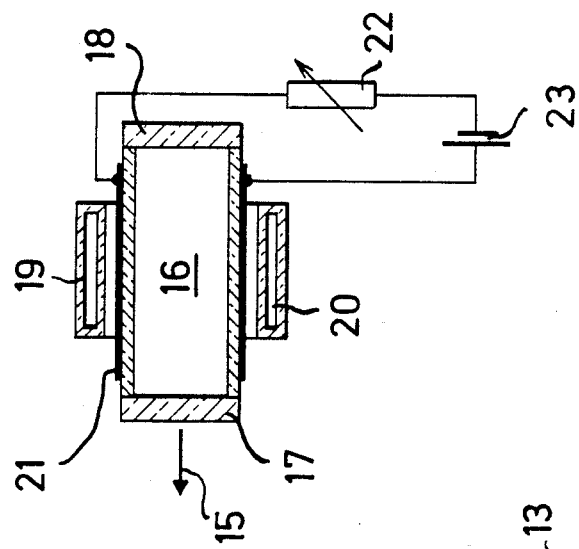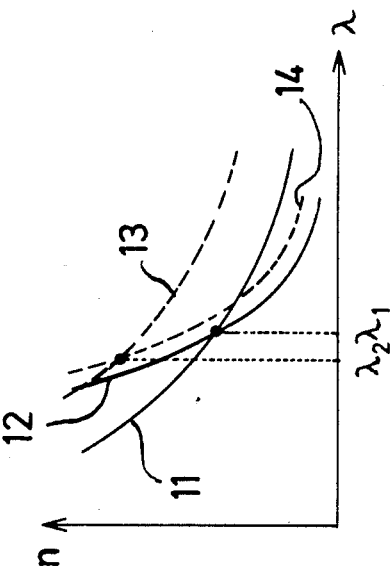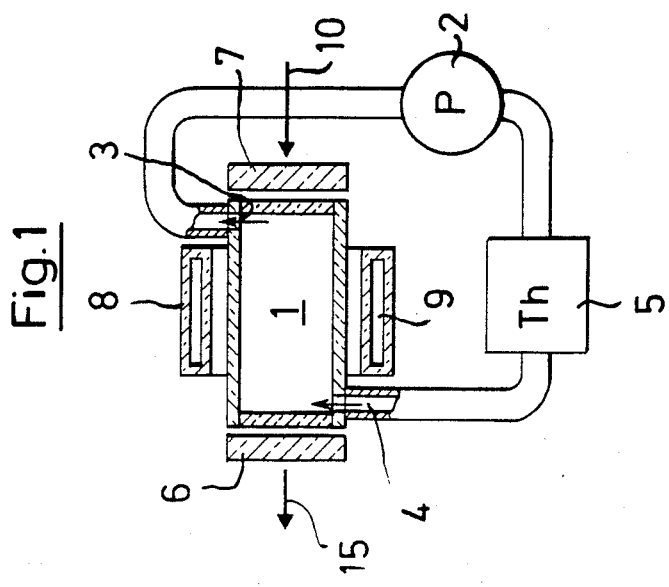

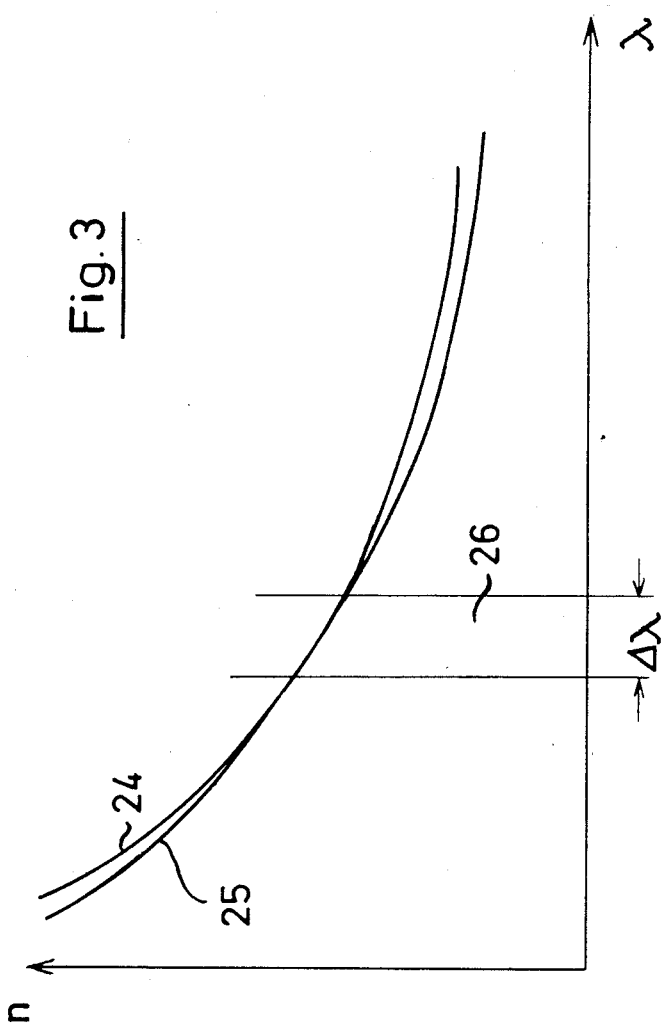

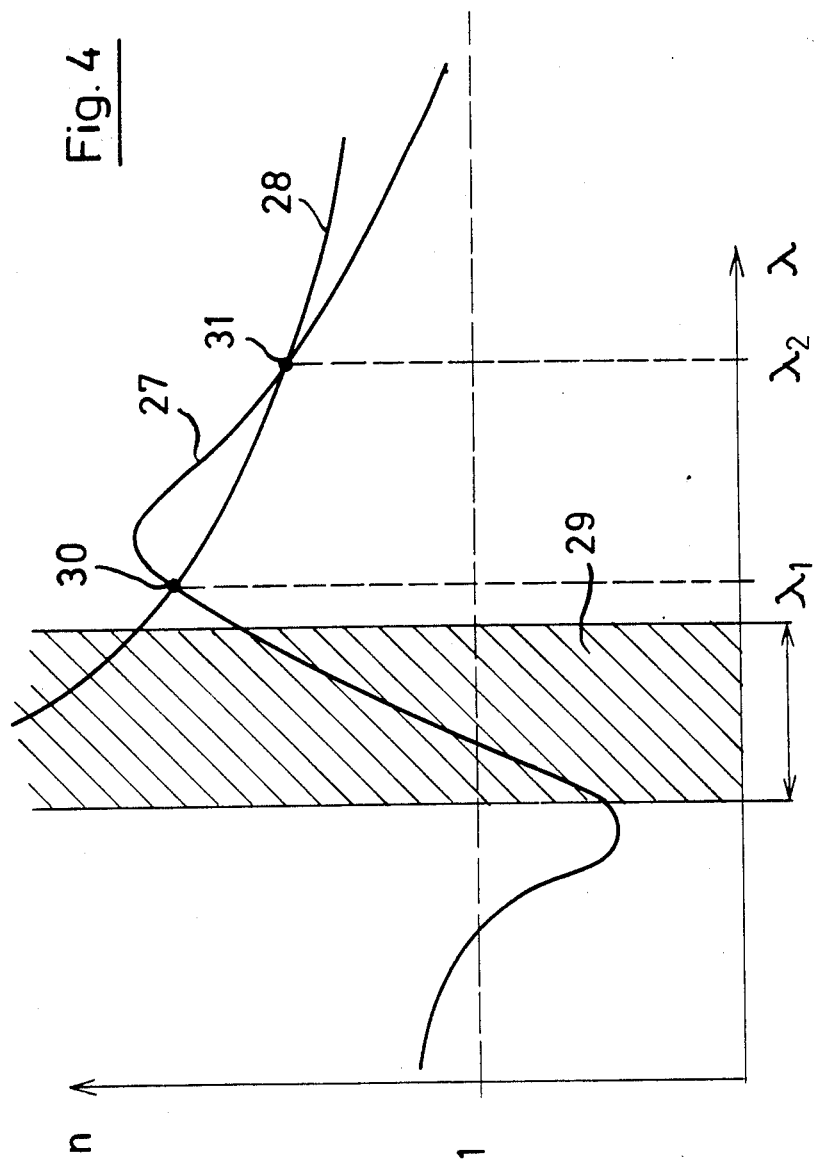

LASER WITH VARIABLE EMISSION WAVELENGTH

BACKGROUND OF THE INVENTION

The present invention is concerned with a laser having variable emission wavelength. Customarily, such lasers comprise a resonator which contains a dye as the laser-active material, a source of pumping light, and a wavelength-dispersive member which can be developed as grid or etalon and which is physically moved to mechanically control a variation of emission wavelength.

The use of such mechanically moved parts results in technical difficulties, particularly with respect to adjustment and change of resonator and pump geometry.

BRIEF STATEMENT OF THE INVENTION

The object of the present invention is to provide a laser which permits variation of emission wavelength without the use of mechanical moving parts in the resonator chamber.

The invention achieves this object in a laser which consists of a resonator containing laser-active material and a source of pumping light, wherein the laser-active material is one of two substances having different but intersecting dispersion characteristics. One of these substances is a granular solid, and the other is a fluid, which may be liquid or gaseous, or even another solid. The intersection is at at least one wavelength, which is the emission wavelength of the laser.

The course of the dispersion curves of the two substances is dependent on the temperature and/or pressure or density. Therefore, these curves and thus their point of intersection as well as the emission wavelength of the laser can be shifted by varying the temperature and/or pressure or density of the substances in the resonator chamber.

So-called dispersion filters (Christiansen filters) are known in which a filter cell contains a powdered optical glass and a liquid, and in which these substances exhibit different dispersion characteristics. The filter substances are so selected that their dispersion curves intersect at a given wavelength. All radiation of this wavelength is passed since, at this wavelength, the two substances have the same index of refraction. Radiation of other wavelengths is reflected on the many boundary surfaces between liquid and glass and cannot pass through the filter. It is known that in such dispersion filters the wavelength of radiation which is passed changes with the temperature, so that in order to maintain constant filter wavelength, the temperature of the filter is held constant within about 0.1° K. ("ABC der Optik," 1961, pages 184/185).

The invention is based on the surprising discovery that the physical principle forming the basis of a dispersion filter can be used also in a laser and that it makes possible in this case the construction of a laser in which the emission wavelength is variable without the use of mechanically moved wavelength-shifting members.

In the laser of the invention, one substance is preferably present in the form of granulate, the diameter of the granulate particles being a value between (1) a multiple of the wavelength order at which wavelength is variable and (2) the mm region. If the solid substance present as granulate is laser-active, it may illustratively consist of neodymium glass. The second substance is then advisedly a fluid, for example, nitrobenzene. Such a laser emits in the near infrared, at about 1 μm.

A laser which emits in the infrared spectral region may illustratively contain cobalt-doped $ZnF_2$ ($Co^{2+}:ZnF_2$) as the granulate, while liquid $CCl_4$ is used as the fluid.

A laser in which the liquid substance is laser-active may illustratively contain the dye Rodamin in the liquid, while the granulate consists of quartz.

Instead of a liquid second substance, the second substance may be a gaseous material. In such case, the variation of emission wavelength is advisedly via variation of the gas pressure.

It is also possible to develop the second substance in the resonator as a solid, for instance by embedding granulated or powdered neodymium glass in NaCl.

In a laser having a liquid as the second substance, this substance may be so selected that the amplification profile of the laser has a predetermined bandwidth. If the dispersion curves of liquid and granulate are very similar to each other, then they contact each other over a given wavelength region which defines the bandwidth of the amplification profile. On the other hand, if the dispersion curves have very different courses, they intersect for all practical purposes at one wavelength, the emission wavelength of the laser.

If a liquid component is selected such that it has an absorption band in the wavelength region of the pumping light, then dispersion anomaly can occur, and there may be two points of intersection with the dispersion curve of the granulate, so that there are two emission wavelengths, i.e., a laser is obtained which simultaneously emits radiation at each of two wavelengths. If desired, one of these wavelengths may be eliminated by a filter arranged in the ray path outside the resonator.

If temperature variation is to be the means of varying the emission wavelength of a laser of the invention, it is advisable to continuously pump a flow of the mixture of material which may consist of granulate and liquid substances, having the consistency of a paste-like mass. Pumps for such paste-like masses are known. A thermostat in the pump line makes it possible to maintain a precise predetermined temperature or to vary the temperature of the flowing mass and thus to control the emission wavelength of the laser.

It is also possible to select the diameter of the particles of granulate of the first substance somewhat larger (mm region) and thus only to pump a flow of the fluid second substance. Variation in the emission wavelength can in such case also be obtained by sequential use of different fluid substances or by change of the concentration of a given second substance. An increase in the temperature of the mixture of material in the resonator chamber can illustratively be effected by a vapor-deposited electrical-resistance layer (optically transparent to the pumping light) on the circumference of the resonator cell. If the granulated particles of the solid substance are provided, as by doping with MgO, with a selective absorption band in the infrared region which is between 7 and 10 μm, then temperature control of emission wavelength is possible via controlled exposure to corresponding infrared radiation.

In the laser of the invention, the resonator mirrors are developed as broad-band mirrors. They can each be suitably used directly as a closure window of the resonator cell, thus enabling a very compact construction of the laser.

Pumping light for the laser of the invention is advantageously so selected that the dispersion curves of substances in the resonator do not intersect at the wavelength or in the wavelength region of the pumping light. Thus, the pumping light is scattered very strongly and diffusely throughout the entire resonator space, and an excellent distribution of pumping-light intensity is obtained within said space.

DETAILED DESCRIPTION

The invention will be described in detail in conjunction with the accompanying drawings, in which:

FIG. 1 is a schematic diagram of one embodiment of the laser of the invention;

FIG. 2 graphically displays the dispersion curves of the two substances contained in the resonator chamber of the laser of FIG. 1, at different temperatures;

FIG. 3 graphically displays the dispersion curves of two substances within the resonator chamber of a dye laser of the invention;

FIG. 4 graphically displays the dispersion curves of two other substances in the resonator chamber of a dye laser of the invention; and FIG. 5 is a diagram similar to FIG. 1, for another laser embodiment.

In the laser of FIG. 1, a cell 1 contains laser-active material. This material illustratively comprises a first solid substance, in the form of finely granulated neodymium glass, and a second substance in the form of a fluid, for example, nitrobenzene. This mixture of substances has a pasty consistency, and a flow thereof is continuously circulated by means of a pump 2. On its path from the outlet 3 of cell 1 and via pump 2 to the cell inlet 4, the mixture of substances flows through thermostat means 5, by which it is brought to desired temperature.

The laser further comprises two resonator mirrors 6-7, of wideband design, and two sources 8-9 of pumping light. In a preferred embodiment, these sources of pumping light may also consist of linear or two-dimensional arrays of semiconductor diode lasers. Instead of these sources of pumping light, the output radiation of a second laser (not shown here) may also be used to pump the laser, said radiation being indicated diagrammatically by an arrow 10.

The dispersion curves of the two substances in the laser cell 1 are shown in FIG. 2. At a preselected temperature $T_1$, the curves have the courses indicated by solid lines 11 and 12, and they are seen to intersect at the wavelength $\lambda_1$. If the temperature of the mixture of substances is changed to the value $T_2$, then the dispersion curves are shifted and now have the courses 13-14 shown by dashed lines. The curves 13-14 intersect at the wavelength $\lambda_2$.

In the indicated embodiment, the second substance is liquid, and its dispersion curves 11-13 exhibit a relatively large shift in response to temperature change.

If the laser cell 1 of FIG. 1 contains a mixture of substances whose dispersion curves have the courses shown in FIG. 2, then at temperature $T_1$, the laser will emit radiation 15 of wavelength $\lambda_1$; and upon change to temperature $T_2$, the wavelength of the emitted radiation changes to the value $\lambda_2$.

If the temperature of the mixture of substances in the laser cell 1 is changed within the range of $\pm 50°$ K., then the emission wavelength can be shifted by about 50 nm, depending on the composition of the mixture of substances. The bandwidth of the amplification profile of the laser will also depend on the composition of the mixture of substances and can lie between about 0.03 and 3 nm.

In the laser of FIG. 1, the radiation from the pumping-light sources 8-9 and/or the radiation 10 from the pump laser are so selected that the wavelength region of the pumping light does not intersect either of the dispersion curves (FIG. 2). In this way, the pumping light is scattered very strongly and diffusely throughout the entire volume of the laser cell 1, so that good excitation efficiency is obtained.

If in the laser of FIG. 1, the second substance is chosen as a liquid in the form of a dye solution, then no pronounced fluctuations in the liquid can occur due to the very small layer thicknesses of the dye lamellae between the particles of the solid substance, illustratively quartz or quartz glass. Heretofore, such fluctuations, due to schlieren formations, have precluded use of large dye cells in the laser resonator.

If the substances of such a dye laser are so selected that their dispersion curves are as shown by way of example in FIG. 3, then the curve 24 of the granulate and the curve 25 of the dye solution do not intersect at a precisely defined point; they contact each other in practice over the region designated by 26. The width $\Delta\lambda$ of region 26 determines the bandwidth of the amplification profile of the laser. It can readily be seen that this bandwidth is determined by the course of the dispersion curves.

In the embodiment of FIG. 4, the dye solution is so selected that it has a dispersion anomaly, characterized by an absorption band within the region 29. As a result, the dispersion curve 27 of the dye solution has such a course that there are two points of intersection (30 and 31) with the dispersion curve 28 of the granulate. The laser thus emits radiation at two wavelengths $\lambda_1$ and $\lambda_2$.

In the embodiment of FIG. 5, the mixture of substances contained in the laser cell 16 contains as the solid substance a granulate of quartz, and as the liquid substance a solution of the dye Rodamin. The resonator mirrors 17-18 directly form the closure windows of the cell 16, so that this laser is of very compact construction. And sources of pumping light are indicated at 19-20.

The laser cell 16 is provided on its cover with an electrical-resistance layer 21 which is transparent to the pumping light. And layer 21 is schematiclaly shown in series connection with a current source 23 and a control member 22. The temperature of the mixture of substances in the cell 16 can be controlled via the control member 22.

If the mixture of substances in the laser cell 16 includes a solid granulate of quartz glass which has an absorption band in the infrared region between 5 and 50 $\mu$m, then a change in the temperature of the mixture of substances is also possible by direct exposure of the cell to corresponding infrared radiation. In such case, the sources of radiation 19-20 are selected for their ability to radiate in this infrared region.

If the solid substance, rather than the liquid substance, is of laser-active material, for example, a uranium-doped $MgF_2$ granulate ($U^{3+}:MgF_2$), then particularly in the case of emission wavelengths in the infrared, the second substance may be gaseous. This affords the possibility of obtaining laser-wavelength variability not only via temperature control, but also via a controlled change in pressure of the gas component. For this purpose, a flow of the gas is advisedly circulated by pumping similar to that shown in FIG. 1.

The use of a mixture consisting of a granulate and a fluid (liquid or gaseous) second substance, wherein one of these substances is the laser-active medium in the laser resonator, is not limited solely to the laser embodiments shown, but can find suitable use also in lasers of different geometry, for example in a laser cell of spherical configuration.

What is claimed is:

1. A laser with variable emission wave-length consisting of a resonator containing the mixture of a first substance, present as a granulate, together with a second substance, at least one of said substances being laser-active, the dispersion curves of the indices of refraction of said two substances having at least one intersection, and a source of pumping light which emits light at a wavelength or in a wavelength region which is outside any wavelength of intersection of said dispersion curves; the dispersion curve of each of said substances having a course which is dependent on temperature or pressure, and selectively operable means for varying the temperature or pressure of said mixture to thereby select the emission wavelength of the laser.

2. A laser according to claim 1, characterized by the fact that the second substance is present in liquid form.

3. A laser according to claim 2, characterized by the fact that the liquid contains a laser-active dye.

4. A laser according to claim 3, characterized by the fact that one of the said substances has a dispersion anomaly in the wavelength region of the pumping light.

5. A laser according to claim 1, characterized by the fact that the second substance is a gas having a dispersion curve which is dependent upon gas-density.

6. A laser according to claim 1, characterized by the fact that the second substance is present as a solid.

7. A laser according to claim 1, characterized by the fact that the mixture of substances has the consistency of a paste-like mass and is moved continuously via a pump in a circuit through the resonator and that a thermostat is provided in the pump circuit.

8. A laser according to claim 1, characterized by the fact that at least one of the substances has a selective absorption band in the infrared region and that sources of radiation (19-20) which emit in the region of said absorption band are provided for temperature control.

9. A laser according to claim 1, characterized by the fact that the resonator is formed by a cell having a closure window which is developed as a broadband resonator mirror (17, 18).

10. A laser according to claim 1, characterized by the fact that the resonator is formed by a cell (16) having a coating of electrical-resistance material which is transparent to pumping light, and means including a current source and a control connected to said resistance material for controlling heat delivery to said cell.

11. A method of using the laser of claim 1, wherein the second substance is a fluid and wherein different fluid substances are sequentially used as said second substance, thereby obtaining variation in emission wavelength.

12. A method of using the laser of claim 1, wherein the second substance is a fluid and wherein the concentration of said second substance is varied to obtain a variation in emission wavelength.

13. A laser with variable-emission wavelength, consisting of a resonator filled with a first substance, present as a granulate, and a second substance, present as a liquid, at least one of said substances being laser-active, the dispersion curves of the indices of refraction of said two substances having at least one intersection, and a source of pumping light which emits light at a wavelength or in a wavelength region which is outside any wavelength of intersection of said dispersion curves; the dispersion curve of each of said substances having a course which is dependent on temperature or pressure, and selectively operable means for varying the temperature or pressure of said liquid to thereby select the emission wavelength of the laser, the liquid substance being moved continuously and via a pump in a circuit through the resonator, and heat-control means including a thermostat in the pump circuit.

14. A laser with variable-emission wavelength, consisting of a resonator filled with a first substance, present as a granulate, and a second substance, present as a gas, at least one of said substances being laser-active, the dispersion curves of the indices of refraction of said two substances having at least one intersection, and a source of pumping light which emits light at a wavelength or in a wavelength region which is outside any wavelength of intersection of said dispersion curves; the dispersion curve of each of said substances having a course which is dependent on temperature or pressure, and selectively operable means for varying the temperature or pressure of said gas to thereby select the emission wavelength of the laser, the gas being moved continuously via a pump in a circuit through the resonator, and heat-control means including a thermostat in the pump circuit.

15. A laser with variable emission wavelength, consisting of a resonator filled with a first substance, present as a granulate, and a second substance, at least one of said substances being laser-active, the dispersion curves of the indices of refraction of said two substances having at least one intersection, and the dispersion curve of at least one of said substances having a course which is dependent on temperature or pressure or density; a source of pumping light in a wavelength region removed from the wavelength band for each of the two substances; and selectively operable means for varying the temperature or pressure or density of said substances within the resonator to thereby select the emission wavelength of the laser.

* * * * *